United States Patent
Sigmund

[15] 3,685,546

[45] Aug. 22, 1972

[54] THERMALLY INSULATED PIPE

[72] Inventor: Franck Sigmund, Eaubonne, France

[73] Assignee: Industriele Onderneming Waving N.V., Zwolle, Netherlands

[22] Filed: June 3, 1970

[21] Appl. No.: 43,041

[52] U.S. Cl. .................. 138/141, 138/112, 138/149
[51] Int. Cl. ............................................. F16z 59/14
[58] Field of Search .................. 138/112, 140–143, 138/149

[56] References Cited

UNITED STATES PATENTS

| 2,761,949 | 9/1956 | Colton | 138/149 X |
| 2,894,538 | 7/1959 | Wilson | 138/149 X |
| 3,377,464 | 4/1968 | Rolfes | 138/149 X |
| 2,718,829 | 9/1955 | Seymour et al. | 138/DIG. 7 |
| 3,453,716 | 7/1969 | Cook | 138/149 X |

FOREIGN PATENTS OR APPLICATIONS 76,765   12/1954   Netherlands .............. 138/149

OTHER PUBLICATIONS

Printed Danish Application, 113,611, Andersen, April, 1969.

*Primary Examiner*—Edward J. Earls
*Attorney*—Woodhams, Blanchard and Flynn

[57] ABSTRACT

A heat insulated pipeline comprising a number of metal tubes welded together end-to-end. Each tube is surrounded by a layer of heat insulating material, such as polyurethane foam, which in turn is enclosed by a protective layer of an impervious material, such as a thermoplastic covering. Intermediate partitions are disposed for connecting the protective layer and the surface of the metal tubes to permit injection of the foam into the complete space defined between the protective layer and the tube.

6 Claims, 7 Drawing Figures

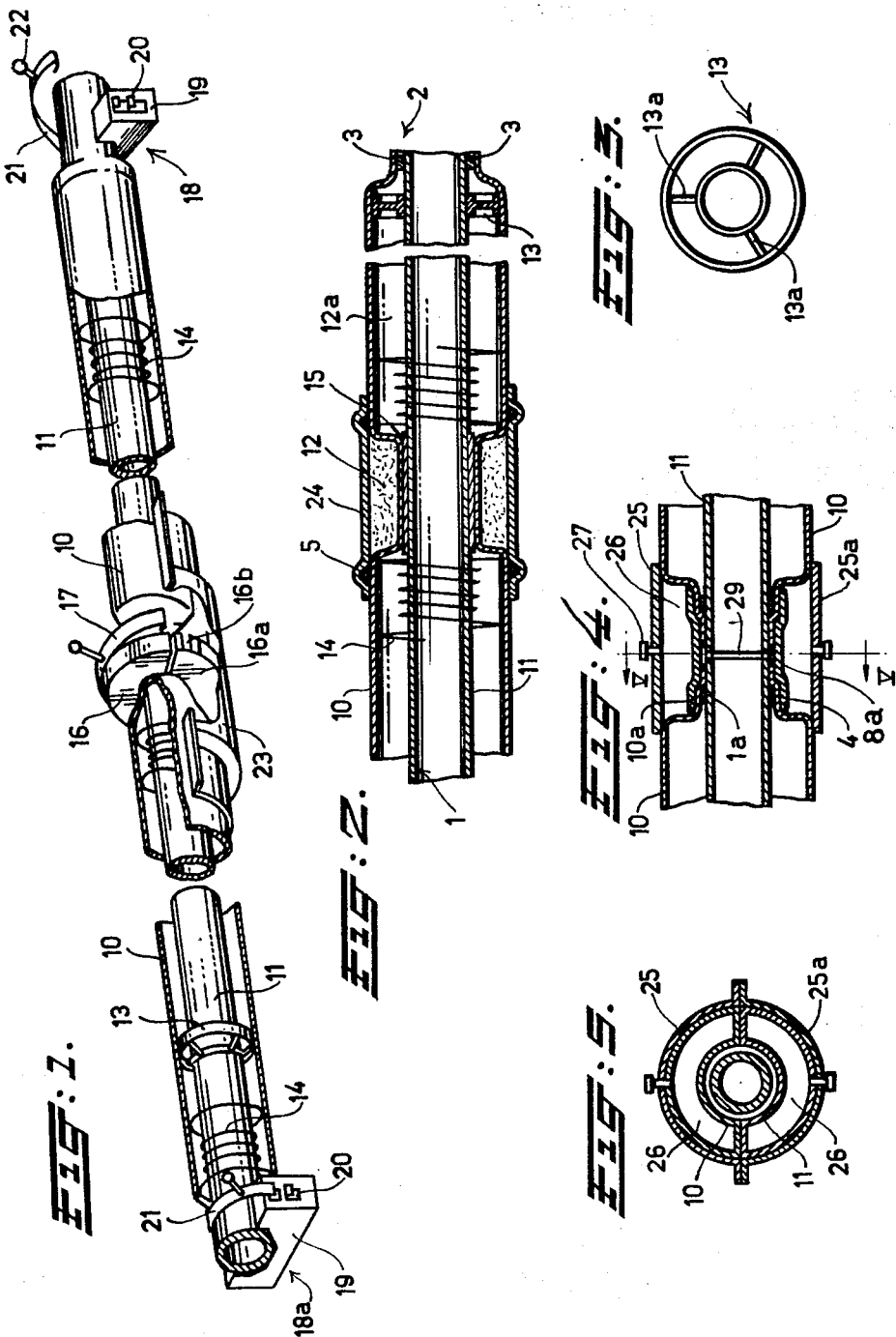

INVENTOR
FRANCK SIGMUND

THERMALLY INSULATED PIPE

This invention relates to the production of heat-insulated pipe and pipe-lines of the kind comprising a series of tubes such as welded tubes welded together end-to-end, each tube being surrounded by a layer of heat-insulating material which is in turn enclosed by a protective layer of an impervious material for preventing penetration of liquids or vapors from the outside into the heat insulating layer.

Such pipelines may be laid in a trench and covered with earth, or may be submerged in water or may be supported above ground. In some cases, e.g. in the case of a pipe line used for conveying heavy fuel oils, efficient heat-insulation is necessary to maintain the fuel oil at a temperature above that of the atmosphere and in other cases, e.g. in the case of a pipeline used for conveying a liquefied gas, efficient heat-insulation is necessary to maintain the liquefied gas at a very low temperature. The effectiveness of the heat-insulation surrounding the metal tubes is, however, liable to be greatly impaired if liquid or vapor is able to penetrate into it. Such penetration can occur at joints between the envelopes of adjoining insulated pipe units or through openings formed in the protective layers for various purposes or as a result of damage to the protective layers caused for example by sharp stones in the case of a pipeline which is buried in a trench, or by the action of substantial external hydrostatic pressure in the case of a pipeline submerged in water.

The most important problem is now to obtain a sealing in the insulating cover with respect to outer mediums (moisture, water, hydrocarbons and the like) even in case the pipe is submerged or when by accident the insulating layer is damaged. In the latter case injuries to the outer protective layer give rise to the penetration of moisture into the insulation which is never entirely impermeable to water, which moisture can move over a long distance from the damaged spot and as a consequence impair the behavior of the insulation. Measures should now be used in order to ensure that such an accident has only limited consequences and repairs can be easily carried out without affecting the whole pipe line system.

Of the usual methods for the provision of insulating coverings particular ones have the advantage of simplicity, but have the drawback that the sealing is not fully effective, while other ones, though they are satisfactory from the angle of sealing or localization of the defects, are complicated and expensive.

The present invention relates to a method and device for obtaining a fully tight insulation. The construction of this insulation is simple and and therefore be easily and quickly carried out and is very efficient, while it can be realized in an economic way.

This object is attained according to the invention in the way that the insulating layer of a pipe or pipe line is accommodated in sealed compartments.

According to a particular embodiment the insulating layer is divided in sealed compartments by means of one or more barriers extending between and tightly engaging the protecting layer and the outer side of the pipe.

In a preferred embodiment the barrier cooperates with flexible sealing means such as rubber, neoprene, thermoplastic rubbers; self curing rubbers such as self curing butyl rubbers and e.g. "compritape".

In a very preferred embodiment the barrier is a part of the protective layer, and cooperates with the outer side of the pipe, whereby preferably sealing means are situated between the barrier and the outer side of the pipe.

Various characteristics and advantages of the invention will appear from the description hereinafter with reference to the accompanying drawings, in which some embodiments are represented.

In the drawing represents:

FIG. 1 is a perspective view of a device, a part of which has been removed, for centering and holding in place an outer envelope or protective layer of an insulated pipe with the devices serving to close the ends of the pipes and the device for centrally dividing the pipe in two or more parts.

FIG. 2 is a longitudinal section of an insulated pipe provided with a closing device for sealing, which closing device is perpendicular to the protective layer.

FIG. 3 is a cross section through a spacer for centering an outer envelope or protective layer.

FIG. 4 shows a longitudinal section through a device used for the formation of a connection for two insulated pipes.

FIG. 5 is a cross section taken substantially along line V—V in FIG. 4.

FIGS. 1 to 3 illustrate an embodiment wherein an the insulating layer is formed between the outer side of a metal pipe and a continuous tubular protective layer.

Figure 6:
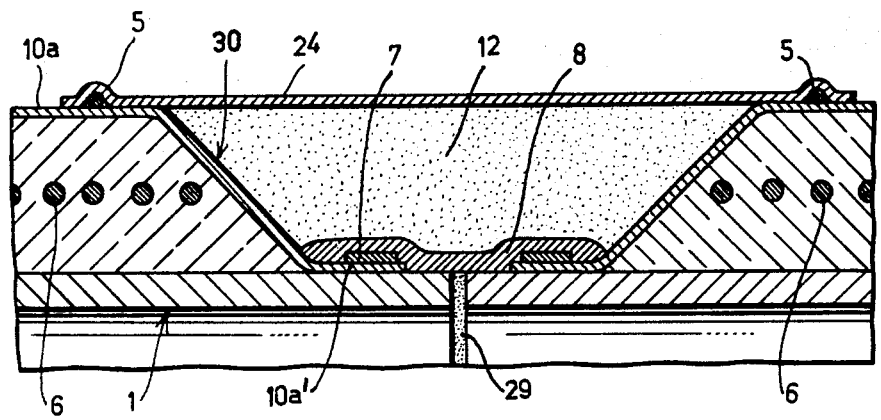
FIG. 6 is a longitudinal section through a modified connection of two pipes.

On the other hand FIGS. 4 to 7 illustrate the possibility of providing the metal pipe with an insulating layer before applying the protective layer. This insulating layer is provided by rotating the metal pipe and spraying a foamable plastic composition such as a foamable urethane composition onto the rotating pipe.

FIGS. 1 and 2 disclose a metal pipe or pipe line 1 provided with an insulating layer 2. The outer side of the insulating layer 2 is covered with a protecting layer comprising an outer elastic or non-elastic envelope 10. The outer tubular envelope or protecting layer 10 is e.g. an envelope of thermoplastic material, such as polyethylene, the inner diameter of the protective layer being equal to that of the pipe to be insulated increased by the double thickness of the insulating layer 2 which fills up the space between the protecting layer 10 and the outer pipe surface 11. The protecting layer 10 may be manufactured from commercially available elements.

For the formation of the insulating layer 2 any of the usual commonly known compositions, e.g. a mixture of polyol and isocyanate with a corresponding admixture, may be used. An injection machine ensures the mixing at ambient temperature of the products used and injects or sprays the mixture as a kind of emulsion by means of an injection gas of the freon type into the space between the outer side 11 of pipe or pipe line 1 and the protecting layer 10. It usually takes about 15 minutes before the emulsion is converted into a resistant foam due to polymerization.

In case of the use of a tubular outer envelope 10 a correct centering of the outer envelope or sleeve 10 with respect to the pipe to be insulated is necessary. This may be accomplished e.g. by means of a spacer ring 13 of a suitable arbitrary material, e.g. polyester or epoxy resin as represented in FIG. 3. Such a ring is advantageously provided with radial arms 13a, has a diameter slightly larger than that of the pipe 1 to be insulated and its outer diameter is smaller than that of the sleeve or envelope 10.

The spacer ring is devised to support the protective layer or outer envelope 10 in such a way that the latter is not deflected during insulation work. Another suitable member is a spiral spring 14 the coils of which have two different diameters viz, an inner diameter, slightly larger than that of the pipe 1 to be insulated and an outer diameter slightly smaller than that of the envelope 10.

These two members can be easily manufactured in large quantities and are used as follows.

The spacer rings 13 (FIG. 2) are placed at each end and on either side of a central closure which will be described hereinafter. The springs 14 are used for filling the space between the aforementioned tube 1 and outer envelope 10. They serve as spacers. They are fixed on the tube 1 to be insulated e.g. by means of a suitable glue or mechanical fastening means in dependence of the foam used for the insulation and the working conditions (principally the temperature) of the insulated pipe.

The object of the present invention is now to solve the problem of the sealing in the longitudinal direction of the insulating layer by means of a tight closure formed during the manufacture of the insulating layer in the following way.

In the middle of the pipe or any other point whereat a closure should be provided, there is disposed on the pipe, prior to providing the outer envelope 10, a seal 15 of elastical material. The seal consists e.g. of neoprene, thermoplastic rubbers e.g., self curing rubber, butyl rubber, natural rubber or "compritape". After having provided the outer envelope 10, a closing device for the envelope is provided at the location of the pipe connection, which device substantially consists of two metal mold halves 16, 16a which can be heated by a built in electric resistance and which on closing are fast controllable by means of a band 17, the bent end of which engages the notches like 16b on the inner half mold 16a.

When the central closing device is located in position, the diameter of the outer sleeve 10 is reduced to a diameter about equal to that of the elastical seal 15, such as a rubber or neoprene seal, so that the reduced diameter portion of sleeve 10 sealingly engages seal 15. Substantially identical devices 18, 18a are disposed at the two ends of the sleeve 10 and these devices are adjusted at a diameter round about that of the metal pipe. These devices consist of a piece 19 which as to shape corresponds with the pipe 1 and which is provided with notches 20 on which comes to bear a closing band 21 with a handle 22.

In each part of the outer envelope 10 formed in this way apertures are provided which are required for the injection of the material of the insulating layer.

The central band 16 presses the envelope of elastic plastic material on the steel pipe 11 and divides it thus in two parts. The pipe is then ready to receive the injection of the foam. An opening, not shown, is provided in the envelope 10 so that the nozzle of the injector may be inserted thereinto. There are many suitable compositions in order to obtain the desired thermal insulation and those are sufficiently known, so that they need not be described. The mixture of the selected products for the obtainment of the desired foam is injected into the free space between the outer side 11 of steel tube 1 and the outer envelope 10.

After the filling process is terminated the molds 16 and 21 are removed. The outer envelope 10 leaves at the ends of the tube a space free of about 30 cm. This free space is required in order to weld the pipes 1 afterwards to one another.

The material of the protective layer 10 besides the spacer 14 and limiting the space below sleeve 24 acts as a barrier.

After the injection into the two parts of the pipe 1 to be insulated is terminated and during the polymerization the central closing device is replaced by a metal mold with two mold halves, the inner mold half 23 of which is only represented in FIG. 1, which mold half has a diameter smaller than that of the outer sleeve 10. Due to the method for the injection of the insulating material like polyurethane, into the space left free between these two molds and the outer envelope, which method is applied for this kind of material, the point with seal 15 is formed. After this injection the mold is removed and a lining layer in the form of a sleeve shrinkable in the presence of heat, like a polyethylene tube 24 which previously has been slid on the outer sleeve 10, is placed on the whole. This lining sleeve shrinkable in the presence of heat is heated so as to have it adjoin exactly the outer surface of the point of injection. In this way the insulating material introduced into the space is protected. Due to this central closure an efficient division or formation of compartments in the insulation of the pipe is obtained in such a way that an injury to the sleeve of any of the compartments formed in this way does not impair the behavior of the other compartments and can be more easily repaired.

Hereinbefore an embodiment has been described wherein the seal of elastic material e.g. rubber, neoprene or similar material is provided in the middle of the pipe. It will however be obvious that also such a seal 3 can be provided at the end 2 of the pipe, e.g. by shrinking the envelope 10 after the provision of the foam insulation for the welded joint 29 at the end on the outer wall of the metal tube, when for instance the starting point is a thermoplastic tubular foil, or by e.g. wrapping round the insulating layer 2 extruded warm polyethylene tape. This may be effected by extruding polyethylene tape at a temperature of 150°–170°C. from an extruder and to wrap this extruded tape overlappingly around the insulating layer of foam plastic already provided. An adequate sealing is ensured on the account of the shrinkage produced when the envelope formed by this tape cools.

A proper sealing is also ensured when an insulating layer 2 sprayed on a pipe is provided with a protective layer 10 of glass fibers and thermosetting resin, e.g. epoxy resin or polyester resin. In that case, pipe sealing means are not always necessary.

It is evident that when the insulating layer is provided by spraying on a rotating pipe spacers 14 can be omitted.

It should be noted that the seal of elastic material is not necessary in case of a protecting layer 10 which adheres firmly to the tube, such as by using a fiber reinforced epoxy resin layer as protecting layer and a metal tube, whereby the metal tube is preferably provided with an epoxy coating (which is known per se).

Figure 7:
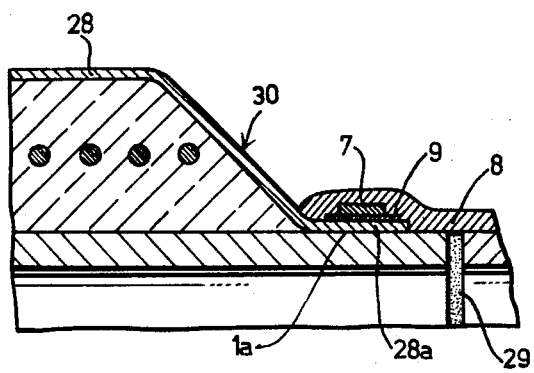
FIG. 7 is a modified embodiment of the connection as shown in FIG. 6.

The same holds for cases in which the cooperation of pipe and barrier 30, as shown in FIGS. 6 and 7, is considered to be sufficient.

In order to avoid leakage in the space below the lining layer 24, second sealing rings 5 of flexible materials such as rubber and similar materials may be accommodated on the surface of the protective layer. During shrinkage of the lining layer 24, the material of rings 5 will be somewhat compressed and an improved sealing effect will be obtained. Said shrinking effect holds for heated thermoplastic materials and for thermosetting resins.

Instead of using flexible rings it is also possible to use rings 5 of a thermoplastic material, whereby the surface of the ring coming into contact with the outer surface of protective thermoplastic layer 10 and the surface coming into contact with the inner surface of the thermoplastic lining layer are provided with metal wire, such that by passing an electric current through these wires, the layers of the thermoplastic materials of the ring being in contact with each other are heatsealed to each other. This is due to the heat dispensed from the resistance wires.

A good contact between the layers may be ensured by using a ring of which the wall thickness decreases regularly from one end to the other, that is a ring presenting a tapered section in the longitudinal direction.

FIGS. 4 and 5 illustrate a connection of two metal pipes by means of a welding joint 29. A barrier is formed by the extension 10a of protecting layer 10 which cooperates over a distance (e.g. 5 – 10 cm.) with the outer side 11 of pipe 1. The protecting layer consists of a layer formed by winding polyethylene tape of a temperature of 150°–170°C. around the insulating layer (not further indicated). A layer 8a of glass fibers is wound around the connection of the metal tubes and around the ends of the protecting layer 10, which cooperate with the outer side 11 of the pipe 1 whereafter a thermosetting resin preferably an epoxy resin is applied onto the glass fibers. The sealing effect may be improved by accommodating a ring of flexible material such as a self curing butyl rubber, which is compressible between the outer side part 1a of pipe 1 and the inner side of the protective layer 10, of e.g. polyethylene.

A mold comprising two mold halves is placed around the connection, whereafter the space 26 is filled with foam plastic, which is introduced through opening 27. After removal of mold halves 25 and 25a a lining layer 24 as shown in FIG. 2 is provided. The lining layer 24 may also be obtained by winding glass fibers and applying thermosetting resin onto these fibers. This is particularly useful in case of a protective layer of a glass fiber reinforced thermosetting resin such as polyester or epoxy resin. Of course rings 5 of flexible compressible material may be applied.

FIG. 6 shows an embodiment whereby the extension 10a' of the protective layer cooperates with the outer side of pipe 1. The protective layer is a thermoplastic layer, such as obtained by winding e.g. polyethylene tape of 160°C. around the insulating layer. The sloping part 30 acts as a barrier. A rubber or other similar flexible and compressible ring 7 is applied onto the outer side of extension 10a', whereafter a layer 8 of a thermosetting resin is applied. It is not necessary to use a fiber reinforced thermosetting resin. A preferred resin is an epoxy resin. By shrinkage of the layer 8 during polymerization, the flexible material 7 such as a self-curing butyl rubber or neoprene or "compritape" will be compressed and ensure an excellent seal.

In some cases it might be recommended to reinforce the epoxy layer 8 by means of glass fibers.

According to FIG. 7 the protecting polyethylene layer formed by winding polyethylene tape of 160°C. around the foam tissue or non-woven 9 comprising fibers having a surface improving adherence to the used thermoplastic layer part 28a and fibers having a surface improving adherence to a thermosetting resin, such as an epoxy or polyester resin. This requirement will be met by glass fibers having a different surface finish or by glass fibers and filaments of thermoplastic material.

The flexible ring 7 of self curing butyl rubber or neoprene, natural rubber will ensure an excellent seal.

It is also possible to apply a tissue or non-woven 9 between the outer side of pipe 1 and part 10a' of the polyethylene layer in the embodiment of FIG. 6. The thermoplastic filaments or other fibers having a surface finish adhering to thermoplastic material will cause a connection between the tissue or non-woven and the protecting layer 10a. On the other hand the glass fibers or other fibers having a surface finish adhering to the thermosetting material will ensure an excellent adherence between the fibers and the epoxy coating on the pipe. Such epoxy coatings preventing corrosion are known per se.

In some cases it may be advisable to reinforce the insulating layer such as a polyurethane foam plastic layer by inserting reinforcing layers, e.g. glass tissue E 130, polyester tissue or even foil material such as polyethylene foil. In this way any cracking of the foam provoked by expansion and shrinking of the steel tube will be limited by these reinforcing layers as a crack will stop after having reached a reinforcing layer.

By using a relatively coarse meshed (e.g. 1 mm meshed) tissue a good cohesion of the whole plastic foam layer 3 is secured. Although this cohesion may be partly or completely lost by using a polyethylene foil (of 0.05 mm thickness), the shrinking effect of the covering layer (either of thermoplastic or of thermosetting resin) will exert a compressive effect onto the foam plastic so that layers at both sides of such a foil are pressed onto each other.

When the layer 10a or 28 consists of a glass fiber reinforced thermosetting (such as polyester or epoxy) resin, the tube part 24 might also be of a thermoplastic material, whereby the sealing rings of rubber 5 are recommended.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An insulated pipe line, comprising an axially spaced elongated weldable pipe, a pair of elongated layers of insulating foam plastic material disposed in surrounding relationship to said pipe, an elongated sleeve-like protective layer of plastic material enclosing said insulating layers for preventin penetration of liquids or vapors from outside into the insulating layers, said sleeve-like protective layer including first and second axially spaced portions to encase said pair of axially spaced insulating layers, said axially spaced portions having confronting annular end portions projecting radially inwardly toward the outer surface of said weldable pipe, and sleeve means of diameter substantially less than the outer diameter of said annular end portions and snugly and sealingly surrounding said pipe, said sleeve means extending axially between the confronting annular end portions and fixedly connecting to the parts of said end portions nearest the pipe for creating a tight sealed relationship between the outer surface of said pipe and said annular end portions, said sleeve means including several radially stacked layers in snug and sealed relation, one such layer comprising reduced diameter protective layer portions integral with and extending axially from said protective layer end portions, another such layer comprising elastic seal ring means, said pipe and seal ring means and reduced diameter protective layer portion lying in circumscribed relationship.

2. An insulated pipe line according to claim 1, wherein said seal ring means is provided on the outer surface of said pipe in surrounding relationship thereto, and said reduced diameter protective layer portions are disposed in surrounding relationship to and in sealing engagement with said seal ring means, said reduced diameter protective layer portions having a diameter substantially closer to said pipe than the diameter of said first and second axially spaced portions of said protective layer, said reduced diameter protective layer portions also being integrally interconnected whereby to be continuous with said first and second axially spaced portions of said protective layer.

3. An insulated pipe line according to claim 1, wherein said sleeve means includes a sleeve of fiber reinforced thermosetting resin disposed in sealing engagement and in surrounding relation to said pipe, said sleeve having the opposite ends thereof disposed in sealing engagement with the radially inner ends of said annular end portions.

4. An insulated pipe line according to claim 3, wherein said elastic seal ring means comprises a resiliently compressible annular sealing member disposed between the radially inner end of each said end portion and the adjacent end of said thermosetting sleeve.

5. An insulated pipe line according to claim 3, wherein the axial ends of the thermosetting sleeve and the reduced diameter protective layer portions overlap, and wherein an annular fiber band is disposed between the overlapping ends of the thermosetting sleeve and the reduced diameter protective layer portions, the fibers adhering to the plastic of the reduced diameter protective layer portions and also adhering to the thermosetting sleeve.

6. An insulated pipe line according to claim 1, wherein the axial space between the confronting annular end portions is filled with further insulating material surrounding said sleeve means, and an annular outer layer is disposed in surrounding relationship to said further insulating material, said annular outer layer extending between said annular end portions and having the opposite axial ends thereof telescoped over the adjacent ends of said first and second axially spaced portions of said protective layer, and means for sealing provided between the ends of said annular outer layer and said protective layer.

* * * * *